United States Patent [19]

Newman et al.

[11] 4,033,381

[45] July 5, 1977

[54] HOT AIR DUCT

[75] Inventors: Ray Newman, Sun Valley; Steve Affa, Torrance, both of Calif.

[73] Assignee: General Connectors Corporation, Burbank, Calif.

[22] Filed: June 27, 1975

[21] Appl. No.: 590,878

[52] U.S. Cl. .............................. 138/113; 138/114; 138/148

[51] Int. Cl.² .......................................... F16L 9/18

[58] Field of Search .......... 138/106, 108, 110, 112, 138/113, 114, 148; 248/49, 55, 67, 74 R, 74 B, 74 PB; 24/16 R, 16 PB, 30; 98/1.5, DIG. 7

[56] References Cited

UNITED STATES PATENTS

| | | | |
|---|---|---|---|
| 155,936 | 10/1874 | Fell | 138/108 |
| 2,531,658 | 11/1950 | Walsh | 138/108 X |
| 2,714,395 | 8/1955 | Epstein | 138/113 |
| 3,219,368 | 11/1965 | Crumpler | 138/103 X |
| 3,226,135 | 12/1965 | Epstein | 138/112 X |
| 3,417,785 | 12/1968 | Andrews | 138/108 |
| 3,765,629 | 10/1973 | Voelker et al. | 138/106 X |
| 3,789,129 | 1/1974 | Ditscheid | 138/113 X |

FOREIGN PATENTS OR APPLICATIONS

| | | | |
|---|---|---|---|
| 1,045,340 | 11/1958 | Germany | 98/DIG. 7 |
| 696,698 | 10/1965 | Italy | 138/148 |

Primary Examiner—Charles E. Phillips
Attorney, Agent, or Firm—Julius L. Rubinstein

[57] ABSTRACT

A hot air duct is formed from thin walled metal tubing. The duct is provided with a plurality of linearly spaced reinforcing rings. Each reinforcing ring is formed from sheet metal and is channel-shaped in cross-section. The rings are rigidly secured to the outer surface of the duct and positioned so they project radially outwardly from the duct with the channel portion inwardly open and facing the outer surface of the duct. With this arrangement the channel portions are closed off, defining ring shaped chambers around the duct. Each ring shaped chamber surrounding the duct is provided with holes to provide communication between the ring-shaped chamber and the ambient air around the external surface of the duct.

1 Claim, 5 Drawing Figures

HOT AIR DUCT

This invention relates to a thin walled tube and more particularly to a thin walled tube designed to serve as a hot air duct for air craft.

The design of hot air ducts for air craft involves many considerations. Chiefly, it is important that they be as light as possible because ducts in modern large air craft are very long and consequently a savings in weight would be significant.

A way to decrease the duct weight would be to decrease wall thickness. This, however, would normally be accompanied by a decrease in strength, and more particularly to an increased weakness to negative pressures when combined with high temperatures. A failure in a duct during flight could cause a disasterous situation.

Another problem with prior hot air ducts for air craft is that vibration often caused them to rub against various surfaces of the air craft during flight. This rubbing, when combined with a thin wall thickness, low duct pressures and high temperatures, also increased the possibility of failure during flight. In addition, contact of the duct with some of the surfaces in the air craft could be dangerous because of the internal arrangement of the fuel lines and other temperatures sensitive parts inside the air craft.

What is needed, therefore, and comprises an important object of this invention, is to provide a light weight hot air duct capable of withstanding high internal temperatures and low internal pressures without deformation or duct failure.

A further object of this invention is to provide a strong, light weight hot air duct which is designed so its outer surface can be kept from rubbing against other ducts or surfaces in the air craft.

Yet another object of this invention is to provide a light weight hot air duct for air craft which is designed so heat can be transfered readily from the interior of the duct to the ambient air to prevent high temperatures from weakening the duct.

These and other objects of this invention will become more apparent when better understood in the light of the accompanying specification and drawings wherein FIG. 1 is an elevational view of the hot air duct constructed according to the principals of this invention, showing how the duct is prevented from rubbing against adjacent surfaces.

Figure 1:
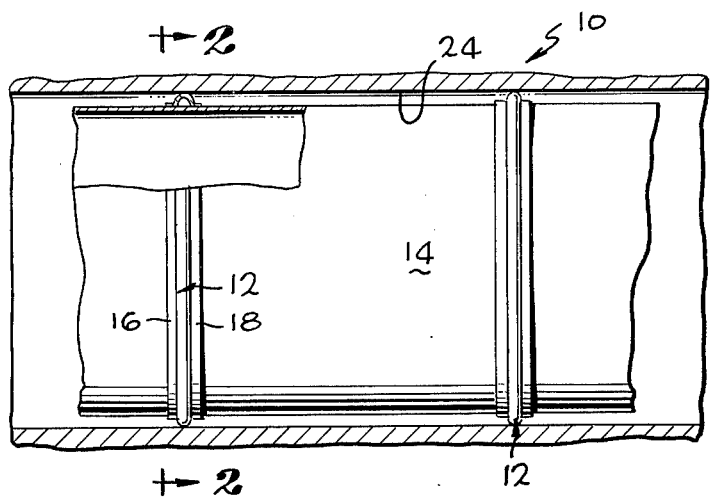

Referring now to FIG. 1 of the drawings, a hot air duct indicated generally by the reference numeral 10 is formed from a thin walled metal tube. A plurality of reinforcing rings 12 disposed in linearly spaced relationship to each other are welded to the external surface 14 of the tube and are preferably formed from thin sheet metal. The rings are shaped so they are generally channel shaped in cross-section with oppositely extending flange mounting portions 16 and 18 disposed at the opening of the channel portion or chamber 20, See FIG. 4.

The chambers 20 are provided with openings 22 which serve both as drain holes and to provide communication between the ambient air around the hot air duct and the interior of the chamber 20 for cooling purposes as will be described below.

The reinforcing rings 12 on the duct or tube 10 serve a plurality of functions. First of all, they are welded by flanges 16 and 18 to the external surface 14 of the tube 10. In this way they help prevent the tube from collapsing when the pressure inside the hot air duct drops lower than the ambient pressure. This permits the ducts to be formed from thinner metal than would otherwise be possible without suffering any decrease in strength. Since as stated above air craft tend to be very large, the ducts are correspondingly large and these savings in weight become very significant.

In addition, the radially projecting sheet metal reinforcing rings 12 also serve as heat radiators and help cool the hot air duct when very hot gases flow through them. This prevents the temperatures inside the duct from rising high enough to weaken the thin metal walls of the tube. Consequently, the hot air duct tube can be made substantially thinner and lighter than would otherwise be possible.

Figure 2:
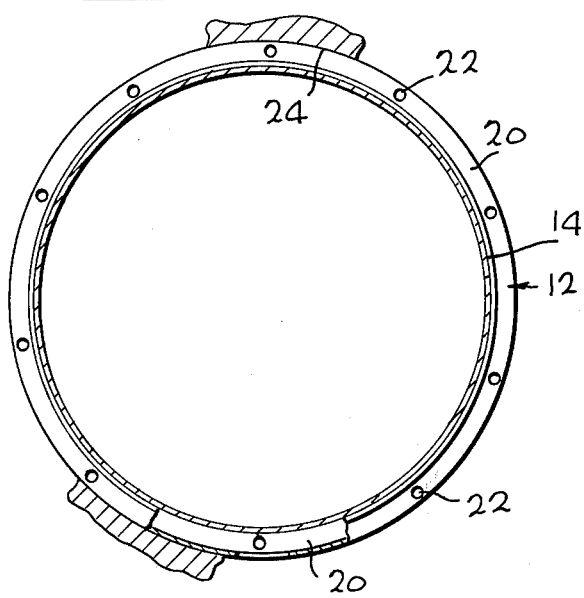
FIG. 2 is a sectional view taken on the line 2—2 of FIG. 1.
Figure 3:
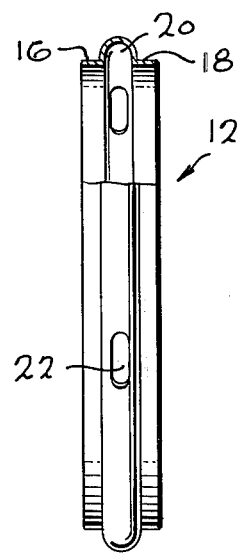
FIG. 3 is an elevational end view of a reinforcing ring designed for a hot air duct.

The ducts have still another function as shown in FIG. 2, in that the channel shaped reinforcing rings 12 serve as bosses or spacers and prevent the surface 14 of the ducts from rubbing against another surface or duct such as surface 24 during flight. Any rubbing that would occur would be on the surface of the radially projecting channel portions of the rings as shown in FIG. 2 and even if the rings 12 wore through because of the rubbing, such as wear would have no effect on the strength or integrity of the duct itself.

Figure 4:
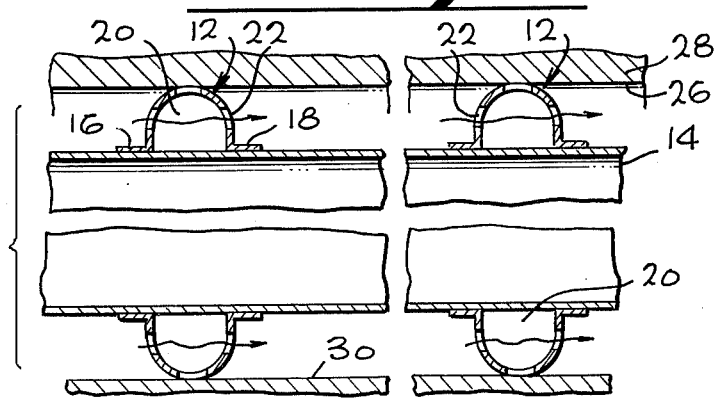
FIG. 4 shows the hot air duct constructed according to the principals of this invention mounted inside a bore.

In addition, the rings are all formed the same way, and each ring 12 is provided with aligned openings 22. Consequently if the rings 12 are secured to the ducts 10 so the aligned openings 22 in each chamber 20 or channel shaped portion are all in linear alignment, as shown in FIG. 4, a source of cooling air can be blown through the aligned openings 22 over the surface of the thin walled metal duct to cool the length of the pipe, so the pipe can withstand higher temperatures and lower pressures than would otherwise be possible. This arrangement is particularly important if the duct 10 has to be mounted inside a bore 26 of a structure 28 and the temperature inside the duct is very high, see FIG. 4. In such a case the radially projecting rings 12 would prevent surface 14 of the ducts from rubbing against the surface 30 of the bore 26. In addition, if as stated above all the openings 22 are in linear alignment, then, if the temperature conditions inside the hot air duct require it, an external source of cold air could be blown through the bore 24 and the air would pass through these aligned openings 22 to cool the length of the duct.

Figure 5:
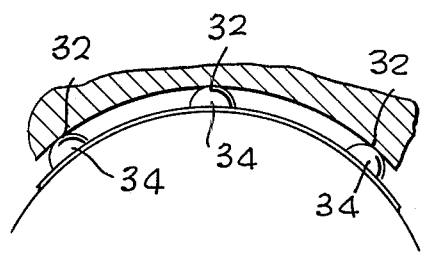
FIG. 5 is an elevational view of a modified hot air duct mounted inside a bore and provided with external cooling.

In the embodiments disclosed in FIGS. 1–4, the chamber 20 surrounding the duct is continuous and is ring shaped. Under some circumstances, however, the chambers 20 could be formed in segments by forming spaced dimples 32 in ring 12, see FIG. 5. This arrangement would permit the chambers 34 in the dimples to be closed off or filled up with other material as circumstances require. At the same time, by properly positioning the rings on the duct, the dimples could be aligned to permit a much greater volume of cooling air to flow through the space between the dimples when the duct is mounted inside a close fitting bore.

Having described the invention, what I claim as new is:

1. A hot air duct for use in aircraft comprising a thin walled tube, a plurality of linearly spaced reinforcing rings secured to the external surface of the tube to prevent the tube from collapsing if the internal pressure of the tube drops substantially, each of said reinforcing rings formed from sheet material and comprising a channel-shaped portion with oppositely extending flange mounting portions attached to the channel shaped portion, said reinforcing rings mounted on the external surface of the tube so the channel shaped portions project radially outwardly providing a heat radiating and a spacing surface around the tube with the channel shaped portion opening inwardly and facing and completely closed off by the external surface of the tube to reinforce the tube, defining thereby a ring shaped chamber around the tube, said oppositely extending flange mounting portions rigidly fastened to the external surface of the tube, an aligned opening formed in each side of each of the channel shaped portions providing thereby communication between the interior and exterior of the channel-shaped portion, said reinforcing rings mounted on the thin walled tube so that the aligned openings in each channel shaped portion of the reinforcing ring are all in linear alignment with each other to define continuous air channels running parallel to the axis of the tube along the length of the tube whereby the external surface of the tube can be cooled readily if a flow of cold air is directed through the said aligned openings in the ring shaped chambers of the reinforcing rings, when said rings engage and serve as a spacer between said duct and a surrounding surface said channel shaped portions extending radially outwardly far enough so if said hot air duct is mounted closely adjacent a surface in the aircraft said channel shaped portions serve as spacers to keep the surface of the tube from rubbing against the surface of the aircraft.

* * * * *